United States Patent [19]

Nagura

[11] Patent Number: 4,652,807
[45] Date of Patent: Mar. 24, 1987

[54] STARTING METHOD FOR INDUCTION MOTORS

[75] Inventor: Osamu Nagura, Katsuta, Japan
[73] Assignee: Hitachi, Ltd., Tokyo, Japan
[21] Appl. No.: 799,977
[22] Filed: Nov. 20, 1985

[30] Foreign Application Priority Data

Nov. 21, 1984 [JP] Japan .................................. 59-244451

[51] Int. Cl.$^4$ ........................... H02P 1/28; H02P 1/30
[52] U.S. Cl. ..................................... 318/778; 318/732; 318/731
[58] Field of Search ............... 318/722, 723, 778, 731, 318/732

[56] References Cited

U.S. PATENT DOCUMENTS

| | | | |
|---|---|---|---|
| 4,039,909 | 8/1977 | Baker | 318/732 |
| 4,132,931 | 1/1979 | Okuyama et al. | 318/732 |
| 4,277,733 | 7/1981 | Munson | 318/732 |

*Primary Examiner*—David Smith, Jr.
*Attorney, Agent, or Firm*—Antonelli, Terry & Wands

[57] ABSTRACT

An induction motor starting method comprises the steps of supplying a predetermined low-frequency current to the primary winding of an induction motor through a first cycloconverter having its input side connected to a commercial-frequency power source and its output side connected to the primary winding, supplying a voltage of a frequency from zero up to a first frequency through a second cycloconverter having its first input side connected to the commercial-frequency power source and its output side connected to the secondary winding, controlling the first cycloconverter to increase the frequency of the low frequency voltage supplied to the primary winding to the first frequency when the rotation speed of the induction motor reaches substantially a first rotation speed, and disconnecting the output side of the first cycloconverter with the primary winding to connect the output side of the first cycloconverter to the second input side of the second cycloconverter and connect the primary winding to the commercial-frequency power source when the rotation speed of the motor reaches substantially a second rotation speed.

5 Claims, 3 Drawing Figures

STARTING METHOD FOR INDUCTION MOTORS

BACKGROUND OF THE INVENTION

The present invention relates to a starting method for induction motors and more particularly to improvements in a starting method for wound-rotor induction motors of the type in which the windings are arranged on the secondary side.

With the recent increase in the atomic power generating equipment, there has been an increasing demand for the automatic frequency controlled operation of hydraulic power plants and the rate of partial-load operation has been increased. As a result, particularly recently an improvement in the efficiency in the partial-load operation has been looked for.

On the other hand, recently there has also been a tendency toward the installation of the hydraulic power generating equipment having large head variations due to limitations to the conditions of location of hydraulic power plants and measures against deterioration of the efficiency due to the head variation have also been looked for.

While various means may be conceived to cope with such deterioration of the efficiency due to the increased head variation, to improve the efficiency through the variable-speed operation of a power generating system has presently been considered to have the greatest realizability. In other words, while, in this type of power generating system, the efficiency of the hydraulic turbine driving the generator will be deteriorated as the head is varied to a lower level, the efficiency of the hydraulic turbine can be prevented from being deteriorated by varying its rotation speed in accordance with the head. Also, the use of such variable-speed power generating system is advantageous in that in the case of a pumped-storage power system the rate of pumping can be adjusted without waste in accordance with the amount of nighttime surplus electric power.

To realize the variable-speed operation of the power generating system, if the generator/motor is a synchronous machine, a thyristor frequency changer is provided between the generator/motor and the electric power system to change the frequency of the generator-motor. In this case, however, the thyristor frequency changer must have a large capacity corresponding to the generation capacity and the manufacturing cost and the power loss during the operation are increased thus making this attempt unpractical.

Then, it is conceivable to use a generator/motor comprising a secondary excitation-type induction motor. The secondary excitation controller of the induction motor has a speed control range with the synchronous speed of the induction motor as the center of the range and the size of the thyristor frequency changer can be decreased by decreasing the speed control range.

An induction motor starting method employing a thyristor frequency changer consisting of a cycloconverter having a controllable output power factor is disclosed in Japanese Patent Unexamined Publication No. 63988/84. This prior art starting method is so designed that the induction motor is started by using the primary-shortcircuiting secondary-excitation variable frequency starting up to 50% of the rated speed and accelerating the motor by the secondary-excitation variable speed operation with the reduced primary voltage between 50 and 100% of the rated speed. This starting method will be described in greater detail with reference to FIG. 1 illustrating a system diagram of an induction generator/motor used in a pumped-storage power plant or the like. In the Figure, numeral 1 designates a pumping hydraulic turbine, and 2 a wound-rotor induction motor for driving the pumping hydraulic turbine 1 (in the case of pumping up). The induction motor 2 includes a primary winding 3 and a secondary winding 4 and the primary winding 3 is connected to the associated circuits through circuit breakers 5, 6 and 7. More particularly, the primary winding 3 is connected to a commercial power source main system 8 through the circuit breaker 5, to the output circuit of an insulating transformer 12 through the circuit breaker 6 and to a short-circuiting circuit 10 through the circuit breaker 7. Numeral 30 designates a filter provided for eliminating the higher harmonic components of the current generated by a cycloconverter. Each of the circuit breakers 5, 6 and 7 may be an oil circuit breaker, magnetic blow-out circuit breaker, vacuum circuit breaker, $SF_6$ circuit breaker or the like.

The secondary winding 4 of the induction motor 2 is connected to the output side of a cycloconverter 11 including Graetz-connection thyristor circuits 22. The input side of the cycloconverter 11 is connected to the insulating transformer 12. The two reactors of each thyristor circuit 22 are short-circuit preventing reactors. The insulating transformer 12 includes a primary winding 13 connected to the commercial power source main system 8 and secondary windings 14 to 16 connected to the cycloconverter 11.

This conventional starting method will now be described. At the rotation speed of the motor from zero up to 50% of the rated speed, the circuit breaker 7 is closed and the circuit breakers 5 and 6 are opened. In other words, the primary winding 3 of the induction motor 2 is short-circuited via the short-circuiting circuit 10 and the secondary winding 4 is excited at a variable frequency by the cycloconverter 11 thereby starting and accelerating the induction motor 2. When the rotation speed reaches 50% of the rated speed, the circuit breaker 7 is opened and the circuit breaker 6 is closed. Thereafter, the phases of the output currents from the cycloconverter 11 are controlled with respect to the secondary voltage so that the induction motor 2 is brought into a variable speed operation and accelerated up to near 100% of the rated speed. After the rotation speed of the induction motor 2 has reached 100% of the rated speed, the circuit breaker 6 is opened and the circuit breaker 5 is closed thus bringing the induction motor 2 into the ordinary secondary-excitation variable speed operation. While this conventional starting method utilizes the exciting cycloconverter 11 for starting purposes thus effecting the starting with a sufficiently large torque without using any special device, the variable frequency range of the cycloconverter 11 is limited and generally the frequency can be controlled over a range from 0 to about 50% of the system frequency. As a result, the circuit breakers 6 and 7 must be closed and opened, respectively, at around 50% of the rated speed so as to effect the change-over from the variable frequency operation to the secondary-excitation variable speed operation. These switching operations of the circuit breakers 6 and 7 cause considerable shock such as voltage variation in the main system. Also, since the circuit breakers 5 and 6 are connected to the power source, in order to close them, it is necessary to control so that the closing is effected when the frequency, level and phase of the voltage of the motor are the same with those of the power source.

SUMMARY OF THE INVENTION

It is an object of the present invention to provide a starting method for induction motors which is so designed that during the starting period the induction motor can be accelerated up to its rated speed without changing the connections between the main system and the induction motor at around 50% of the rated speed.

In accordance with the invention, there is thus provided a starting method in which a second cycloconverter is connected between the secondary winding of an induction motor and a commercial power source main system and a first cycloconverter is connected between the second cycloconverter and the commercial power source main system so as to be selectively connectable with the second cycloconverter and the primary winding of the induction motor whereby during the interval of time from the start to about 50% of the rated speed the first cycloconverter is connected to the primary winding of the induction motor to excite it at a fixed frequency and the second cycloconverter is connected to the secondary winding of the induction motor to supply it with a variable-frequency power thereby effecting the low-frequency starting and acceleration of the induction motor. Then, when the rotation speed reaches 50% of the rated speed, with the second cycloconverter being connected to the secondary winding of the induction motor, the secondary winding is excited at a fixed frequency of its final frequency value and the variable-frequency power is supplied to the primary winding through the first cycloconverter thereby accelerating the induction motor. When the rated speed of the induction motor is reached or nearly reached, the primary winding of the induction motor is connected to the commercial power source main system and the secondary winding is connected to the series-connected circuit of the first and second cycloconverters thereby bringing the induction motor into a secondary-excitation variable speed operation.

The present invention will be apparent from the following detailed description taken in conjunction with the accompanying drawings.

DESCRIPTION OF THE PREFERRED EMBODIMENTS

Figure 1:
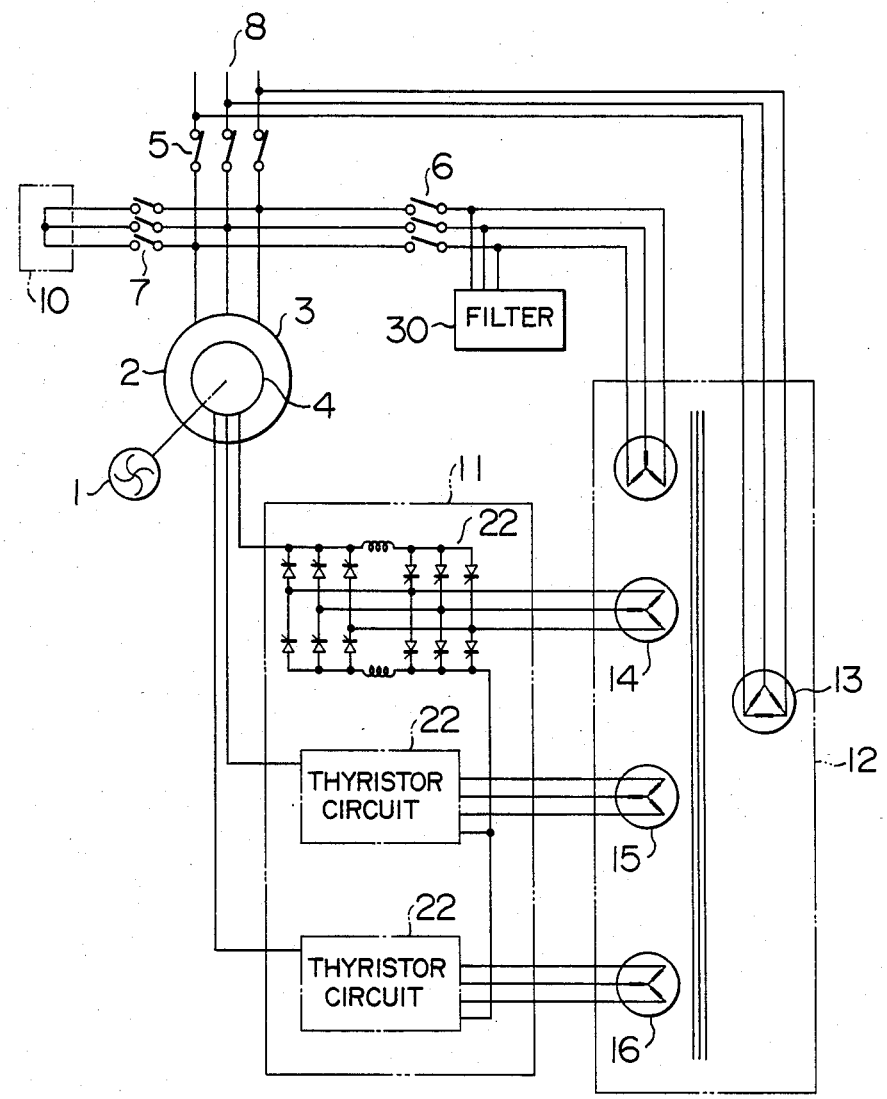
FIG. 1 is a connection diagram for explaining a conventional starting method for the secondary excitation type induction motors.
Figure 2:
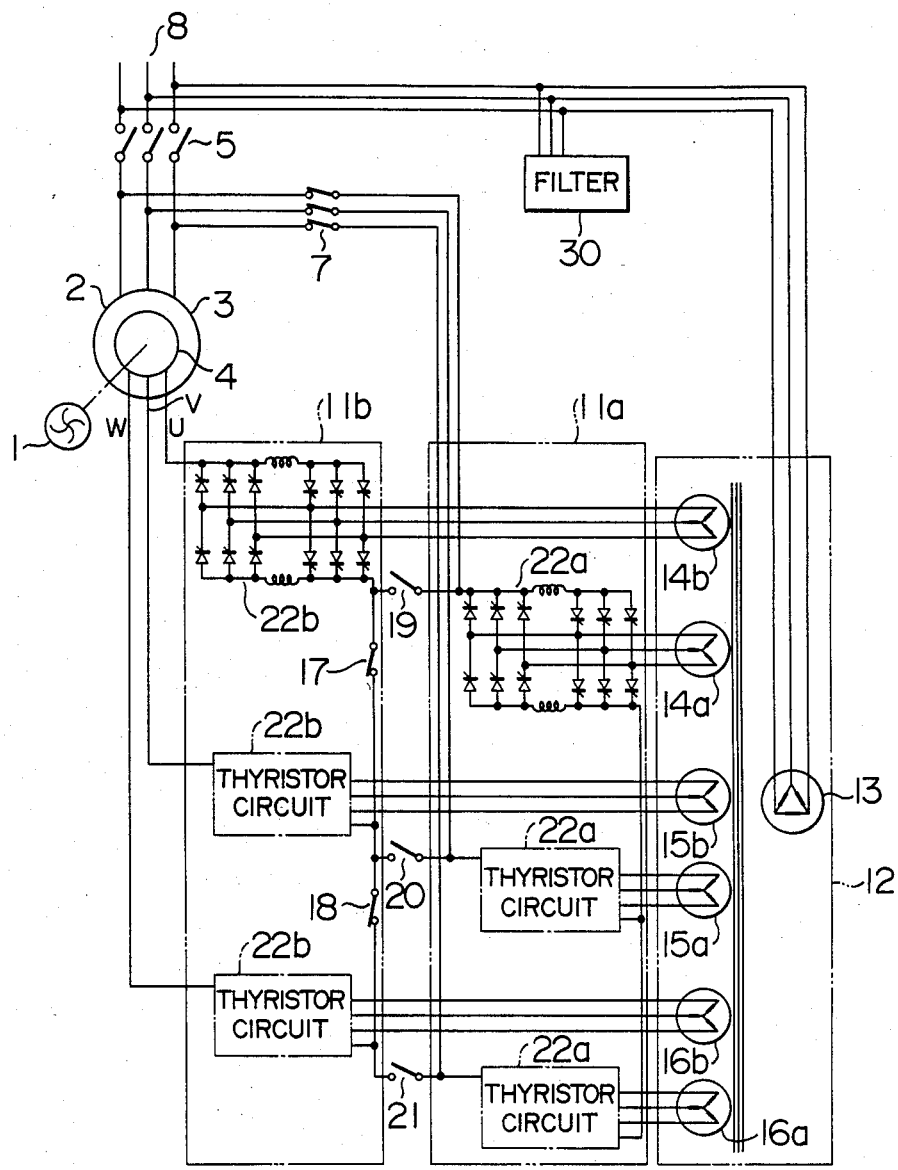
FIGS. 2 and 3 are connection diagrams for explaining a starting method for the secondary excitation type induction motors according to the present invention.

Referring to FIG. 2, numeral 1 designates a pumping hydraulic turbine, and 2 a wound-rotor induction generator/motor of the wound-rotor induction machine construction adapted to be driven or drive the pumping hydraulic turbine 1. The wound-rotor induction generator/motor 2 includes a primary winding 3 and a secondary winding 4 and the primary winding 3 is connected to a commercial power source main system 8 through a circuit breaker 5 and to a cycloconverter 11a (a first cycloconverter) through a circuit breaker 7. The secondary winding 4 is connected to a cycloconverter 11b (a second cycloconverter). The second cycloconverter 11b and the first cycloconverter 11a are designed so as to be combined into a single cycloconverter or form two separate cycloconverters through the switching of circuit breakers 17 and 18 and 19, 20 and 21. An insulating transformer 12 is arranged to supply the power to the cycloconverter 11a and 11b and it includes the three-phase windings corresponding to these cycloconverters.

Figure 3:
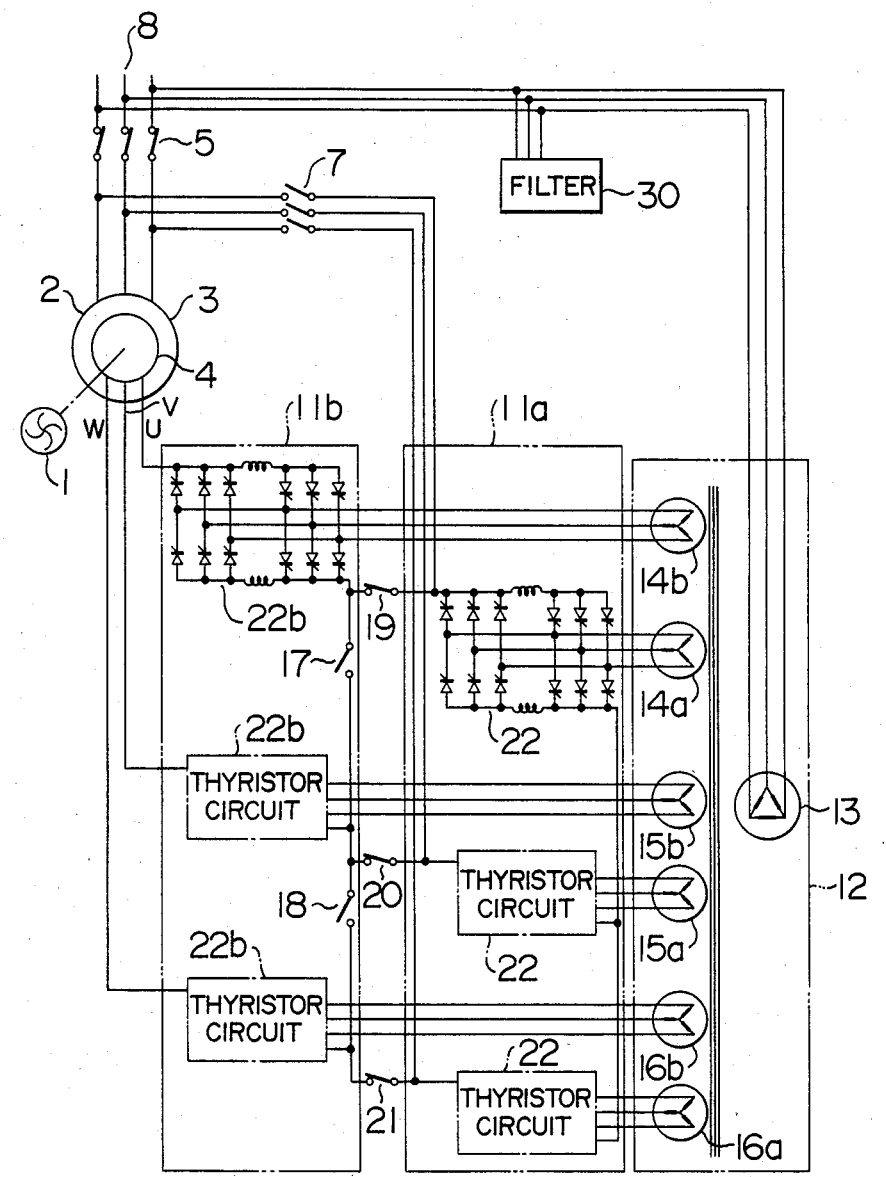

With the above-described arrangement, during the normal variable-speed operation, as shown in FIG. 3, the circuit breaker 5 is closed and the circuit breaker 7 is opened thus connecting the primary winding 3 of the induction generator/motor 2 to the commercial power source main system 8. Also, the circuit breakers 17 and 18 of the second cycloconverter 11b are opened and the circuit breakers 19, 20 and 21 for connecting the first and second cycloconverters 11a and 11b are closed. Thus, the first and second cycloconverters 11a and 11b are connected in series and are controlled as a single cycloconverter. This condition is the same with the ordinary secondary-excitation variable-speed operation.

During the starting period of the induction generator/motor 2, as shown in FIG. 2, the circuit breaker 5 is opened to disconnect the primary winding 3 of the induction generator/motor 2 from the commercial power source main system 8 and also the circuit breaker 7a is closed to connect the first cycloconverter 11a to the primary winding 3. Also, the circuit breakers 19, 20 and 21 are opened and the circuit breakers 17 and 18 are closed thereby causing the first and second cycloconverters 11a and 11b to be independent from each other.

In this condition, the starting is effected in the following manner. Firstly, a very low-frequency three-phase alternating current or direct current is supplied through the first cycloconverter 11a connected to the primary winding 3. Then, the output frequency of the second cycloconverter 11b connected to the secondary winding 4 is gradually increased from zero up to 50% of the system frequency and the rotation speed of the generator/motor 2 is increased to 50% of the rated speed by this low-frequency synchronous starting. Then, in the condition where the excitation frequency of the secondary winding 4 is maintained at 50% of the system frequency, the output frequency of the first cycloconverter 11a connected to the primary winding 3 is increased and the rotation speed is accelerated up to 100% of the rated speed by the so-called induction motor secondary-excitation control.

When the rotation speed is increased near to 100% of the rated speed, the circuit breaker 7a is opened and the first cycloconverter 11a is disconnected with the primary winding 3 thus effecting the change-over to the previously mentioned ordinary operating condition of FIG. 3 and thereby completing the starting.

In this case, while generally the induction generator/motor 2 is of the wound-rotor induction motor construction in which the primary winding 3 is the stator winding and the secondary winding 4 is the rotor winding, the stator winding and the rotor winding are equivalent in principle to each other and it is of course possible to effect the starting and acceleration through the low-frequency synchronous starting by the secondary winding 4 and the secondary excitation control by the primary winding 3, respectively, contrary to the above-mentioned starting method.

As described hereinabove, in accordance with the invention, when the motor speed reaches 50% of the rated speed, the change-over between the control modes of the cycloconverters is effected and the motor speed is accelerated up to the rated speed. Thus, there is the effect of eliminating the need to change the connections between the main system and the motor at around 50% of the rated speed as previously.

I claim:

1. A method of starting an induction motor having a primary winding and a secondary winding comprising the steps of:
   supplying a predetermined low-frequency current to the primary winding of said induction motor, said predetermined low-frequency voltage being supplied to said primary winding through a first cycloconverter having an input side thereof connected to a commercial-frequency power source and an output side thereof connected to said primary winding;
   supplying to the secondary winding of said induction motor a voltage of a frequency from zero up to a first frequency, said voltage of a frequency from zero up to a first frequency being supplied to said secondary winding through a second cycloconverter having a first input side thereof connected to said commercial-frequency power source and an output side thereof connected to said secondary winding;
   controlling said first cycloconverter to increase the frequency of said low-frequency current supplied to said primary winding to said first frequency when a rotation speed of said induction motor substantially reaches a first rotation speed; and
   disconnecting the output side of said first cycloconverter with said primary winding to connect the output side of said first cycloconverter to a second input side of said second cycloconverter and to connect said primary winding to said commercial-frequency power source when the rotation speed of said induction motor reaches substantially a second rotation speed.

2. A method according to claim 1, wherein said first frequency is about one half the value of said commercial frequency.

3. A method according to claim 1, wherein said first rotation speed is about one half the value of a rated speed of said motor, and wherein said second rotation speed is substantially equal to the value of said rated speed.

4. A method according to claim 1, wherein the input side of said first cycloconverter and the first input side of said second cycloconverter are connected to said commercial-frequency power source through an insulating transformer.

5. A method according to claim 4, wherein a primary side of said insulating transformer includes a filter for eliminating higher harmonic components.

* * * * *